US011212725B2

(12) United States Patent
Liu et al.

(10) Patent No.: US 11,212,725 B2
(45) Date of Patent: Dec. 28, 2021

(54) USER EQUIPMENT AND METHOD OF WIRELESS COMMUNICATION OF SAME

(71) Applicant: GUANGDONG OPPO MOBILE TELECOMMUNICATIONS CORP., LTD., Guangdong (CN)

(72) Inventors: Jianhua Liu, Guangdong (CN); Yang Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/765,714

(22) PCT Filed: Nov. 26, 2018

(86) PCT No.: PCT/CN2018/117364
§ 371 (c)(1),
(2) Date: May 20, 2020

(87) PCT Pub. No.: WO2019/101189
PCT Pub. Date: May 31, 2019

(65) Prior Publication Data
US 2020/0296646 A1    Sep. 17, 2020

Related U.S. Application Data

(60) Provisional application No. 62/590,978, filed on Nov. 27, 2017.

(51) Int. Cl.
*H04W 4/00*       (2018.01)
*H04W 36/14*      (2009.01)
*H04W 84/04*      (2009.01)

(52) U.S. Cl.
CPC .......... *H04W 36/14* (2013.01); *H04W 84/042* (2013.01)

(58) Field of Classification Search
CPC ... H04W 36/14; H04W 84/042; H04W 88/06; H04W 8/24; H04W 76/28
USPC .......................... 370/331; 455/312–316, 436
See application file for complete search history.

(56) References Cited

U.S. PATENT DOCUMENTS

| 7,047,009 | B2 | 5/2006 | Laroia |
| 7,376,425 | B2 | 5/2008 | Laroia |
| 8,554,226 | B2 | 10/2013 | Laroia |
| 8,867,488 | B2 | 10/2014 | Ding |

(Continued)

FOREIGN PATENT DOCUMENTS

| CN | 1937840 A | 3/2007 |
| CN | 101686517 A | 3/2010 |
| WO | 2017085621 A1 | 5/2017 |

OTHER PUBLICATIONS

Supplementary European Search Report in the European application No. 18880888.5, dated Dec. 14, 2020.

(Continued)

*Primary Examiner* — Marcos Batista
(74) *Attorney, Agent, or Firm* — Ladas & Parry LLP

(57) ABSTRACT

A user equipment and a method of wireless communication of same are provided. The method includes transmitting, to a first network, an indication when the user equipment is connected to the first network and is intended to be connected to a second network, and switching a transmission of the user equipment on the first network to the second network.

18 Claims, 3 Drawing Sheets

(56) References Cited

U.S. PATENT DOCUMENTS

| | | | |
|---|---|---|---|
| 9,191,873 B1* | 11/2015 | Singh | H04W 36/0022 |
| 2005/0124344 A1 | 6/2005 | Laroia | |
| 2006/0073836 A1 | 4/2006 | Laroia | |
| 2008/0287130 A1 | 11/2008 | Laroia | |
| 2012/0182970 A1 | 7/2012 | Ding | |
| 2017/0331670 A1 | 11/2017 | Parkvall et al. | |
| 2018/0227166 A1 | 8/2018 | Palenius et al. | |
| 2019/0158345 A1 | 5/2019 | Lincoln et al. | |
| 2020/0028745 A1 | 1/2020 | Parkvall et al. | |
| 2020/0304362 A1 | 9/2020 | Palenius et al. | |
| 2020/0358646 A1 | 11/2020 | Bonas et al. | |
| 2021/0099925 A1* | 4/2021 | Keller | H04W 36/0066 |

OTHER PUBLICATIONS

3GPP TS 23.501 V0.4.0 (Apr. 2017), "System Architecture for the 5G System", Technical Specification Group Services and System Aspects, Stage 2 (Release 15), pp. 1-123.

3GPP TS 36 306 V13.0.0 (Dec. 2015), "User Equipment (UE) radio access capabilities", Technical Specification Group Radio Access Network, Evolved Universal Terrestrial Radio Access (E-UTRA) (Release 13), pp. 1-48.

International Search Report in the interational application No. PCT/CN2018/117364 dated Feb. 26, 2019.

Written Opinion of the international Seareh Authority in the intemational application No. PCT/CN2018/117364, dated Feb. 26, 2019.

"3rd Generation Partnership Project; Technical Specification Group Radio Access Network: Evolved Universal Terrestrial Radio Access E-UTRA) and Evolved Universal Terrestrial Radio Access Network E-UTRAN); Overall description; Stage 2 (Release 14)", 3GPP Draft: 36300-40, 3rd Generation Partnership Project (3GPP), Mobile Competence Centre; 650, Route Des Lucioles: F-06921 Sophia-Antipolis Cedex: France, Sep. 26, 2017 (Sep. 26, 2017), XP051354064.

First Office Action of the European application No. 18880888.5, dated Aug. 4, 2021.

First Office Action of the Indian application No. 202017018602, dated Jun. 10, 2021.

* cited by examiner

USER EQUIPMENT AND METHOD OF WIRELESS COMMUNICATION OF SAME

RELATED APPLICATION

This application is an application under 35 U.S.C. 371 of international Application No. PCT/CN2018/117364 filed on Nov. 26, 2018, which claims priority to and the benefit of U.S. Provisional Application No. 62/590,978 filed on Nov. 27, 2017, the entire contents of each of which are incorporated herein by reference.

BACKGROUND OF DISCLOSURE

1. Field of the Disclosure

The present disclosure relates to the field of communication systems, and more particularly, to a user equipment and a method of wireless communication of same.

2. Description of the Related Art

When using dual registration (DR) mode of operation, user equipment (UE) behavior is impacted by UE's lower layer capability. In details, UE, can have one of three lower layer capabilities as following:

1. Single reception (Rx): With this capability, the UE can actively send and receive in only one system (such as a network). In order to check a paging channel in another system, or perform any other activity in the another system, such as periodic registration update, the UE needs to "tune away" from the current system.

2. Dual Rx/Single transmission (Tx): With this capability, the UE can listen to the paging channel in the another system while simultaneously being active in the current system. If the UE needs to respond to a paging message in the another system or perform any other activity in the another system, such as periodic registration update, the UE again needs to "tune away" from the current system.

3. Dual Rx/Dual Tx: With this capability, the UE can simultaneously send and receive in both systems.

As described above, UEs with single Rx or dual Rx/single Tx need to "tune away" from the current system while performing transmission in the another system, because the UE can transmit over only one radio access technology (RAT).

This implies that a UE has to autonomously release a connection to the current system and make an access to the another system. From a network perspective, the UE will seem to have gone out of coverage. While networks can handle UEs going out of coverage, it can impact network algorithms and key performance indicators (KPIs).

Therefore, there is a need to provide a user equipment and a method of wireless communication of same to solve the above technical problems of the prior art.

SUMMARY

An object of the present disclosure is to propose a user equipment and a method of wireless communication of same capable of providing a good connection management when the user equipment tunes away.

In a first aspect of the present disclosure, a user equipment for wireless communication includes a memory, a transceiver, and a processor coupled to the memory and the transceiver. The processor is configured to control the transceiver to transmit, to a first network, an indication when the processor is connected to the first network and is intended to be connected to a second network, and switch a transmission of the user equipment on the first network to the second network.

In a second aspect of the present disclosure, a method of wireless communication of a user equipment includes transmitting, to a first network, an indication when the user equipment is connected to the first network and is intended to be connected to a second network, and switching a transmission of the user equipment on the first network to the second network.

In a third aspect of the present disclosure, a non-transitory machine-readable storage medium has stored thereon instructions that, when executed by a computer, cause the computer to perform the above method.

In a forth aspect of the present disclosure, a terminal device includes a processor and a memory configured to store a computer program. The processor is configured to execute the computer program stored in the memory to perform the above method.

In the embodiment of the present disclosure, the user equipment and the method of wireless communication of same aim to propose an optimization when a user equipment (UE), such as a single reception (Rx) or dual Rx/single transmission (Tx) UE, tunes away from a current system (such as a network) to another system using keeping a current connection suspended, and when the UE comes back the another system, the UE can resume the old connection. When the UE is in the another system, connection and/or context in the old system is store in network (such as a core network or access network) and/or the UE.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DEL AILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
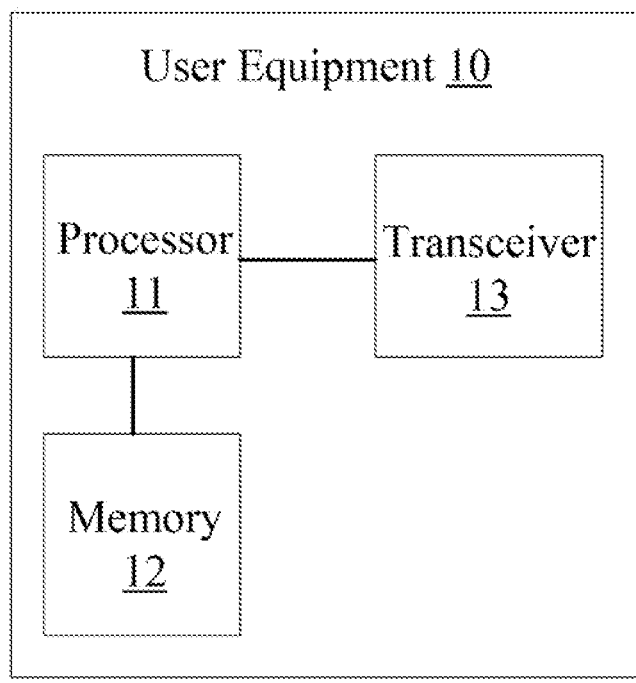
FIG. 1 is a block diagram of a user equipment for wireless communication according to an embodiment of the present disclosure.

FIG. 1 illustrates that, in some embodiments, a user equipment (UE) 10 for wireless communication may include a processor 11, a memory 12 and a transceiver 13. The processor 11 may be configured to implement proposed functions, procedures and/or methods described in this description. Layers of radio interface protocol may be implemented in the processor 11. The memory 12 is operatively coupled with the processor 11 and stores a variety of information to operate the processor 11. The transceiver 13 is operatively coupled with the processor 11, and transmits and/or receives a radio signal.

The processor 11 may include application-specific integrated circuit (ASIC), other chipset, logic circuit and/or data processing device. The memory 12 may include read/only memory (ROM), random access memory (RAM), flash memory, memory card, storage medium and/or other storage device. The transceiver 13 may include baseband circuitry to process radio frequency signals. When the embodiments are implemented in software, the techniques described herein can be implemented with modules (e.g., procedures, functions, and so on) that perform the functions described herein. The modules can be stored in the memory 12 and executed by the processor 11. The memory 12 can be implemented within the processor 11 or external to the processor 11 in which case those can be communicatively coupled to the processor 11 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) new radio (NR) Release 16 and beyond. UEs are communicated with each other directly via a sidelink interface such as a PC5 interface.

In some embodiments, the processor 11 is configured to control the transceiver 13 to transmit, to a first network, an indication when the processor 11 is connected to the first network and is intended to be connected to a second network, and switch a transmission of the user equipment 10 on the first network to the second network.

Figure 2:
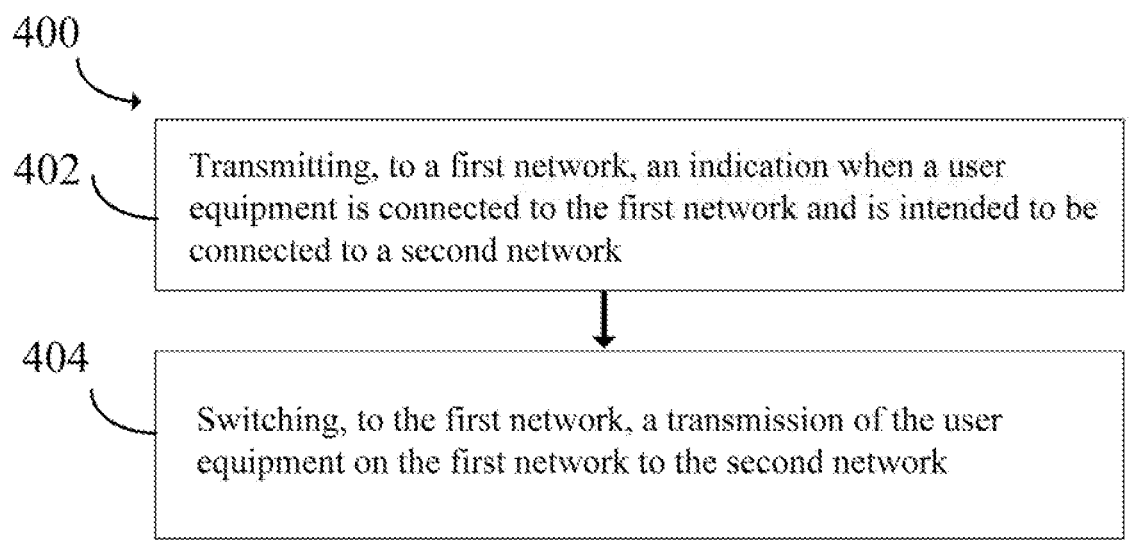
FIG. 2 is a flowchart illustrating a method of wireless communication of a user equipment according to an embodiment of the present disclosure.

FIG. 2 illustrates a method 400 of wireless communication of the UE 10 according to an embodiment of the present disclosure.

The method 400 includes: at block 402, transmitting, to a first network, an indication when the user equipment 10 is connected to the first network and is intended to be connected to a second network, and at block 404, switching, to the first network, a transmission of the user equipment 10 on the first network to the second network.

Figure 3:
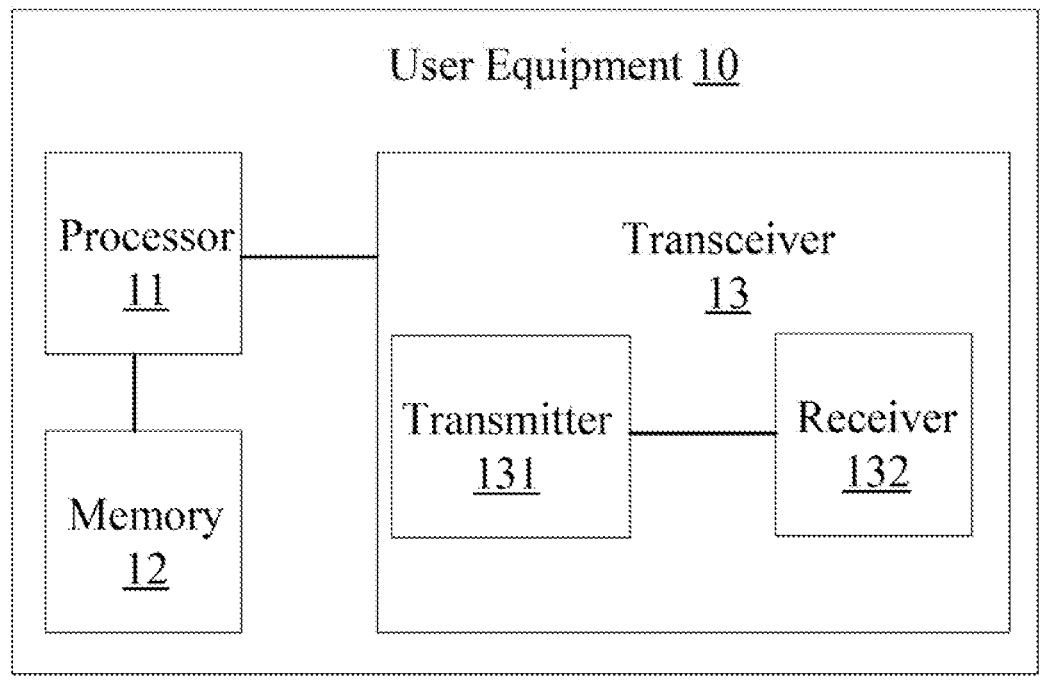
FIG. 3 is a block diagram of a user equipment for wireless communication according to an embodiment of the present disclosure.

In some embodiments, the processor 11 is configured to switch a reception of the user equipment 10 on the first network to the second network. When the transceiver 13 has a single transmission structure and a single reception structure (such as a transmitter 131 and a receiver 132 as illustrated in FIG. 3), the processor 11 is configured to switch the transmission and the reception of the user equipment 10 on the first network to the second network.

Figure 4:
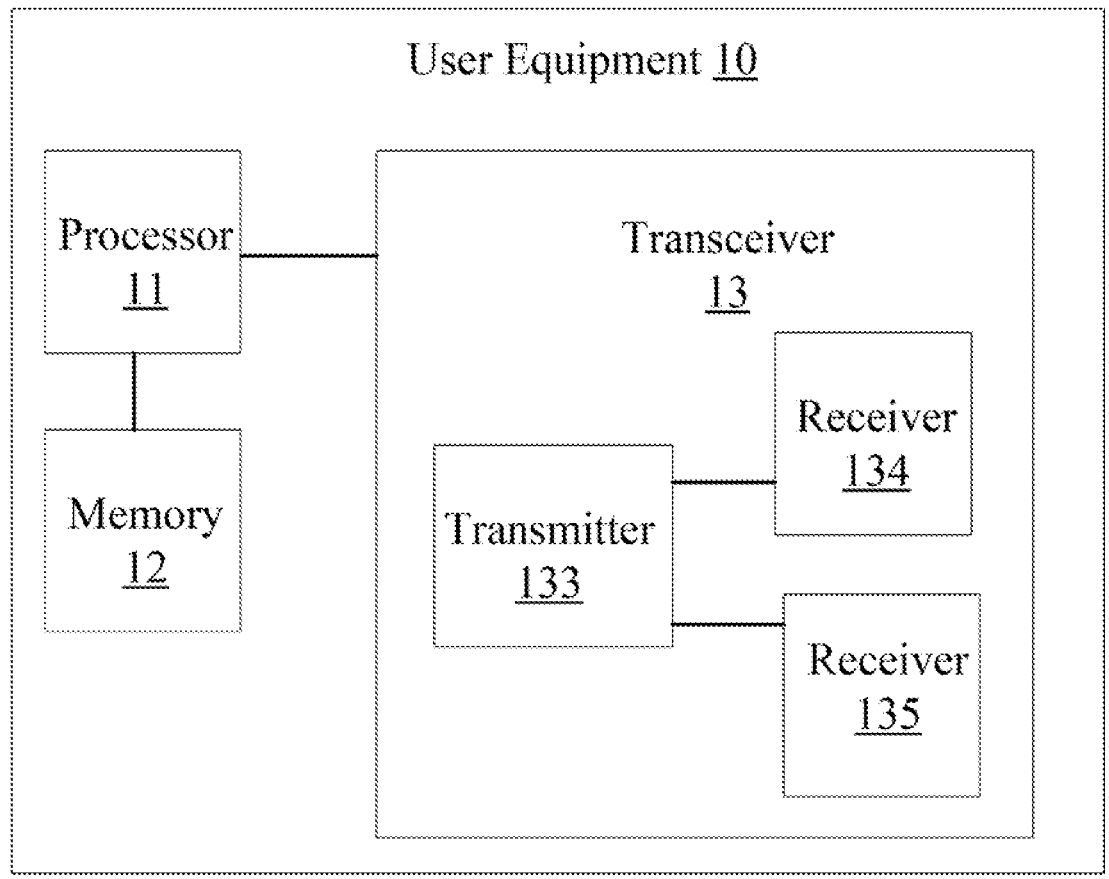
FIG. 4 is a block diagram of a user equipment for wireless communication according to an embodiment of the present disclosure.

In some embodiments, when the transceiver 13 has a single transmission structure and a dual reception structure (such as a transmitter 133 and receivers 134 and 135 as illustrated in FIG. 4), the processor 11 is configured to switch the transmission of the user equipment 10 on the first network to the second network.

In some embodiments, the processor 11 is configured to indicate, to the first network, a second network information. The second network information includes a target network type and/or a target network identity. The second network is, for example, a core network or access network. The first network and the second network are different.

In some embodiments, one of the first network and the second network is an evolved packet core (EPC), and the other of the first network and the second network is a fifth-generation core network (5GC).

In some embodiments, one of the first network and the second network is one public land mobile network (PLMN) and the other of the first network and the second network is another PLMN. In some embodiments, each of the two PLMNs is an equivalent PLMN.

In some embodiments, after the processor 11 switches the transmission of the user equipment 10 on the first network to the second network, a user equipment connection and/or context of the user equipment 10 is suspended by the first network. The user equipment connection and/or context of the user equipment 10 is, for example, stored in a network and/or the memory 12.

In some embodiments, the transceiver 13 is configured to receive a confirmation regarding a sustentation of the user equipment connection and/or context of the user equipment 10 from the first network. The processor 11 autonomously switches the transmission or the transmission and a reception of the user equipment 10 on the first network to the second network. In another embodiment, the processor 11 switches the transmission or the transmission and a reception of the user equipment 10 on the first network to the second network when the transceiver 13 receives the confirmation retard nu the sustentation of the user equipment connection and context/or of the user equipment 10 from the first network.

In some embodiments, when the processor 11 completes a communication with the second network, the processor 11 switches the transmission or the transmission and a reception of the user equipment 10 on the second network to the first network. The transceiver 13 is configured to transmit, to the first network, another indication to resume a connection with the first network. The transceiver 13 is configured to receive a confirmation regarding a resuming of the connection with the first network from the first network.

In some embodiments, the second network is configured to retrieve a user equipment information from the first network. The user equipment information includes a user equipment capability information. When the processor 11 switches the transmission or the transmission and a reception of the user equipment 10 on the first network to the second network, the processor 11 indicates, to the second network, a first network information. The second network is configured to obtain a first network information from a user equipment index if the user equipment index is related to the first network information. The user equipment index includes the first network information. In another embodiment, the first network information is mapped from the user equipment index.

The user equipment index, for example, provides a mapping between 5G globally unique temporary UE identity (5G-GUTI) and 4G-GUTI. When the UE 10 moves from 5GC to an EPC, the UE 10 needs to map the 5G-GUTI to the 4G-GUTI.

In some embodiments, the mapping of the 5G-GUTI to the 4G-GU TI is done as follows. MCC of 5GC maps to MCC of EPC (that is a 4G system.) MNC of 5GC maps to MNC of EPC. AMF region ID of 5GC maps to MME group ID of EPC. AMF set ID and AMF pointer of 5GC map to MME code of EPC. 5G-TMSI of 5GC maps to M-TMSI of EPC. MCC and MNC have the same field size as in earlier 3GPP systems. 5G-TMSI is of 32 bits length. AMP region ID is of 16 bits length. AMF set ID is of 4 bits length. AMF pointer is of 4 bits length.

Figure 5:
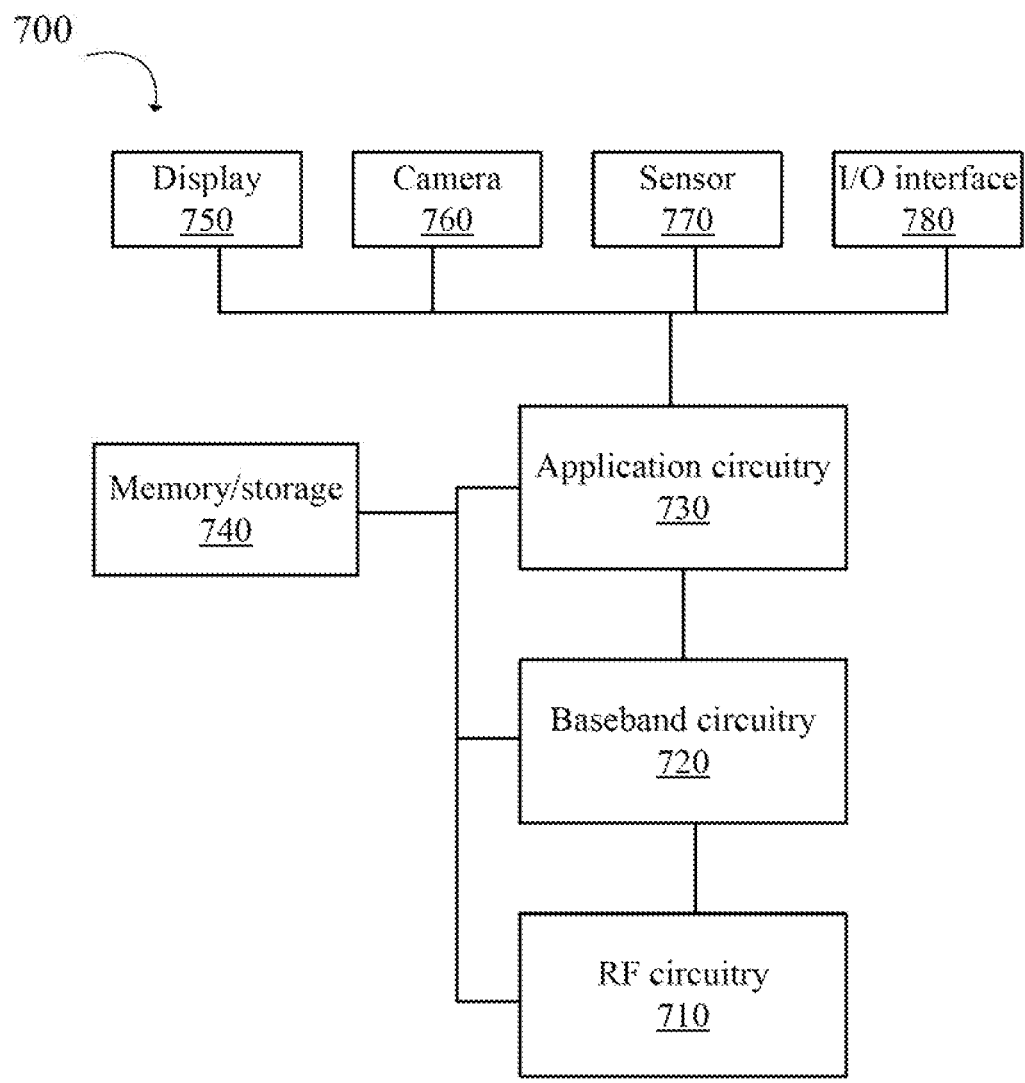
FIG. 5 is a block diagram of a system for wireless communication according to an embodiment of the present disclosure.

FIG. 5 is a block diagram of an example system 700 for wireless communication according to an embodiment of the present disclosure. Embodiments described herein may be implemented into the system using any suitably configured hardware and/or software. FIG. 5 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN) a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc, to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing, device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

In the embodiment of the present disclosure, the user equipment and the method of wireless communication of same aim to propose an optimization when a user equipment (UE), such as a single reception (Rx) or dual Rx/single transmission (Tx) UE, tunes away from a current system (such as a network) to another system using keeping a current connection suspended, and when the UE comes back the another system, the UE can resume the old connection. When the UE is in the another system, connection and/or context in the old system is store in network (such as a core network or access network) and/or the UE. The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment for wireless communication, comprising:
   a memory;
   a transceiver; and
   a processor coupled to the memory and the transceiver, wherein the processor is configured to:
   control the transceiver to transmit, to a first network, an indication when the user equipment is connected to the first network and is intended to be connected to a second network; and switch a transmission of the user equipment on the first network to the second network,
   wherein after the processor switches the transmission of the user equipment on the first network to the second network, a user equipment connection and/or context of the user equipment is suspended by the first network, and
   wherein the transceiver is configured to:
   receive a confirmation regarding a sustentation of the user equipment connection and/or context of the user equipment from the first network.

2. The user equipment of claim 1, Wherein the processor is configured to switch a reception of the user equipment on the first network to the second network.

3. The user equipment of claim 2, wherein when the transceiver has a single transmission structure and a single reception structure, the processor is configured to switch the transmission and the reception of the user equipment on the first network to the second network.

4. The user equipment of claim 1, wherein when the transceiver has a single transmission structure and a dual reception structure, the processor is configured to switch the transmission of the user equipment on the first network to the second network.

5. The user equipment of claim 1, wherein the processor is configured to indicate, to the first network, a second network information.

6. The user equipment of claim 5, wherein the second network information comprises a target network type and/or a target network identity.

7. The user equipment of claim 1, wherein one of the first network and the second network is an evolved packet core (EPC), and the other of the first network and the second network is a fifth-generation core network (5GC).

8. The user equipment of claim 1, wherein one of the first network and the second network is one public land mobile network (PLMN) and the other of the first network and the second network is another PLMN.

9. The user equipment of claim 8, wherein each of the two PLMNs is an equivalent PLMN.

10. The user equipment of claim 1, wherein the processor autonomously switches the transmission or the transmission and a reception of the user equipment on the first network to the second network.

11. A method of wireless communication of a user :equipment, comprising:
   transmitting, to a first network, an indication when the user equipment is connected to the first network. and is intended to be connected to a second network; and
   switching a transmission of the user equipment on the first network to the second network,
   wherein after the switching the transmission of the user equipment on the first network to the second network a user equipment connection and/or context of the user equipment is suspended by the first network, and the method further comprises:
   receiving a confirmation regarding a sustentation of the user equipment connection and/or context of the user equipment from the first network.

12. The method of claim 11, wherein the second network is configured to retrieve a user equipment information from the first network.

13. The method of claim 12, wherein the user equipment information comprises a user equipment capability information.

14. The method of claim 12, further comprising switching the transmission or the transmission and a reception of the user equipment on the first network to the second network, and indicating, to the second network, a first network information.

15. The method of claim 12, wherein the second network is configured to obtain a first network information from a user equipment index if the user equipment index is related to the first network information.

16. The method of claim 15, wherein the user equipment index comprises the first network information.

17. The method of claim 15, wherein the first network information is mapped from the user equipment index.

18. A non-transitory machine-readable storage medium having stored thereon instructions that, when executed by a computer, cause the computer to perform a method, the method comprising:

transmitting, to a first network, an indication when the user equipment is connected to the first network and is intended to be connected to a second network; and switching a transmission of the user equipment on the first network to the second network, wherein after the switching the transmission of the user equipment on the first network to the second network, a user equipment Connection and/or context of the user equipment is suspended by the first network, and the method further comprises:

receiving a confirmation regarding a sustentation of the user equipment connection and/or context of the user equipment from the first network.

\* \* \* \* \*